Dec. 30, 1947. H. G. HUGHEY 2,433,610
WATER-COOLED LANCE TORCH
Filed Feb. 25, 1944 2 Sheets-Sheet 1
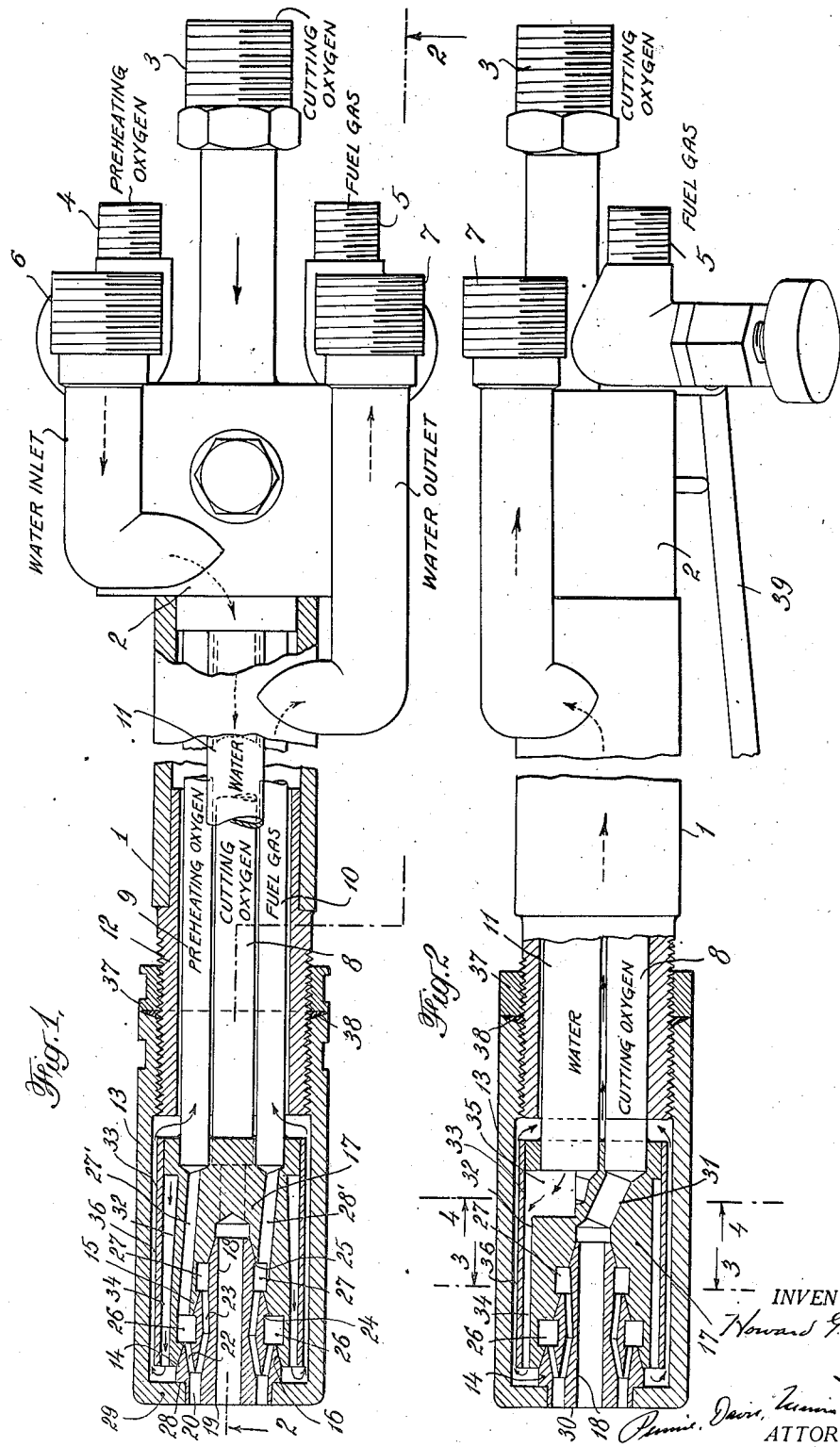
INVENTOR.
Howard G. Hughey
ATTORNEYS Dec. 30, 1947.  H. G. HUGHEY  2,433,610
WATER-COOLED LANCE TORCH
Filed Feb. 25, 1944  2 Sheets-Sheet 2
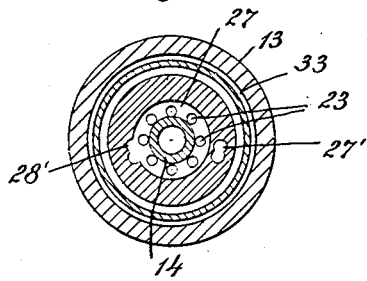
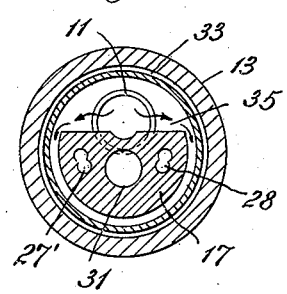
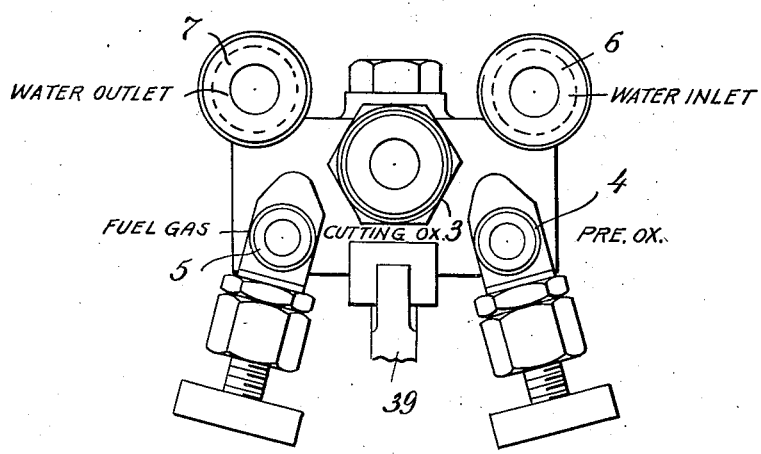
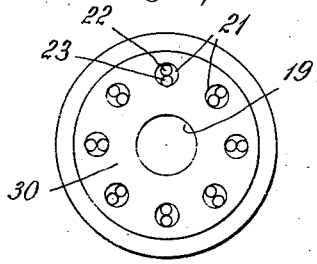
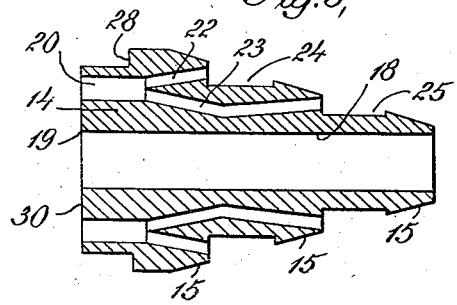

Patented Dec. 30, 1947

2,433,610

UNITED STATES PATENT OFFICE 2,433,610

WATER-COOLED LANCE TORCH

Howard G. Hughey, Fanwood, N. J., assignor to Air Reduction Company, Incorporated, a corporation of New York Application February 25, 1944, Serial No. 523,851

10 Claims. (Cl. 158—27.4)

1

This invention relates to improvements in so-called lance torches, i. e., oxy-fuel gas torches for making relatively deep holes in metal objects or mineral substances.

It is desirable that a torch of this type be cooled by circulating through it a cooling liquid such as water.

The principal object of this invention is to provide a lance torch having an improved circulating system for the cooling liquid. One feature of the invention is that an external member screwed onto the tip end of the torch casing constitutes a water jacket and at the same time performs the function of the usual tip nut for holding in place the removable tip of the torch.

A lance torch embodying the invention is illustrated in the accompanying drawings, in which:

Figure 1 is a plan view partly in section of the torch;

Fig. 2 is a longitudinal vertical section taken on the line 2—2 of Fig. 1;

Fig. 3 is a transverse section taken on the line 3—3 of Fig. 2;

Fig. 4 is a transverse section taken on the line 4—4 of Fig. 2;

Fig. 5 is a rear elevation of the torch shown in Fig. 1;

Fig. 6 illustrates the tip itself in longitudinal section, and

Fig. 7 is an end view of the torch tip looking directly at the face of the tip in which the discharge orifices are located.

The torch illustrated in the drawing comprises an elongated external tubular casing 1 which is connected, at the inlet end of the torch, with an end block 2. This block has an inlet connection 3 for cutting oxygen, an inlet connection 4 for preheating oxygen, and an inlet connection 5 for fuel gas, such as acetylene. It also has an inlet connection 6 for cooling liquid, such as water, and an outlet connection 7 for the cooling liquid.

The casing 1 houses four tubes which conduct the cutting oxygen, the preheating oxygen, the acetylene, and the cooling water, toward the tip of the torch. These tubes are shown at 8, 9, 10 and 11 respectively.

At the tip end of the torch the casing 1 is secured to a sleeve 12 which forms an extension of the casing and through which the tubes 8, 9, 10 and 11 also pass. A portion of the sleeve 12 beyond the casing 1 is externally threaded so that a cylindrical water jacket 13 may be screwed onto it as shown in Figs. 1 and 2. The water jacket 13 also performs the function of the usual tip nut

2 for holding the torch tip 14 in place as hereinafter described.

The tip itself removed from the torch is shown in Figs. 6 and 7. It is preferably of a well known removable type having a conical end portion 15 which is received by a tapered seat 16 in the head 17 of the torch. The tip is provided with a central passage 18 for the cutting oxygen terminating in a discharge orifice 19 in the face of the tip (Fig. 7). In the particular torch illustrated in the drawings the oxygen and fuel gas for the preheating flames is mixed within the tip itself. At the discharge end of the tip the central passage 18 is surrounded by a circular series of passages 20 which feed the gas mixture to the preheating flames. The passages 20 terminate in a circular series of discharge orifices 21 (Fig. 7) in the face of the tip from which the preheating flames issue. Each of the passages 20 in the tip for the gas mixture has preheating oxygen delivered to it by a passage 22 and has fuel gas delivered to it by a passage 23. The passages 22 all communicate with an annular recess 24 in the tapered end of the tip and the passages 23 all communicate with a similar annular recess 25. When the tip is in place in the torch these annular recesses register with corresponding annular recesses in the head 18 to form an annular distributing chamber 26 for the preheating oxygen and an annular distributing chamber 27 for the fuel gas, as shown in Figs. 1 and 2. The distributing chamber 26 feeds all of the passages 22 with preheating oxygen and the distributing chamber 27 feeds all of the passages 23 with fuel gas.

The tip is provided with a shoulder 28 adapted to be engaged by an inwardly extending flange 29 on the water jacket 13 such that when the water jacket is screwed onto the sleeve 12 the tip is retracted into the torch and its conical end is firmly seated in the tapered seat in the head 18. Thus the water jacket serves as a tip nut to hold the tip in place as above stated. When the water jacket is removed the tip can be removed for replacement or repair.

The torch tip is of standard construction except that its discharge end is considerably shorter than usual so that its face 30 will lie substantially flush with the end face of the flange 29 on the water jacket 13, as shown in Figs. 1 and 2.

The head 17 is carried by the ends of the tubes 8, 9, 10 and 11. It has a passage 27' which places the preheating oxygen tube 9 in communication with the distributing chamber 27 and a passage 28' which places the fuel gas tube 10 in communication with the distributing chamber 28, as best shown in Fig. 1. It also has a passage 31 which places the cutting oxygen tube 8 in communication with the central passage 18 in the torch tip, as best shown in Fig. 2.

The end portion of the head 17 which receives the discharge ends of the tubes 8, 9, 10 and 11 is of larger diameter than the remainder of the head leaving a portion of reduced diameter shown at 32 in Figs. 1 and 2. To the portion of larger diameter there is secured a cylindrical baffle 33 which projects forwardly and surrounds the head portion 32 of reduced diameter forming an annular water passage 34 next to the head 17. The external diameter of the baffle 33 is less than the internal diameter of the water jacket 13 thus forming an annular water passage 36 between the baffle and the water jacket. Water is admitted to the innermost annular passage 34 from the water supply tube 11 through a cut-away portion in the head forming a space 35 which establishes communication between the water supply tube and the annular water passage 34. After the cooling water flows toward the tip end of the torch through the innermost passage 34 it flows around the end of the baffle 33 and returns through the outer annular passage 36. This passage communicates with the space to the rear of the head 17 and the space within the sleeve 12 and casing 1.

There is preferably a packing nut 37 on the threaded end of the sleeve 12 which can be turned on the sleeve to move it axially toward the edge of the water jacket 13 and thereby compress a suitable packing material 38 to make a water tight joint at this place.

The sleeve 12, although a separate member which is attached to the casing tube 1 by silver solder or in any other suitable way, constitutes in effect a part of the casing itself. The water jacket 13 may also be considered as part of the casing.

It will now be seen that cooling water enters the torch through the inlet 6 and then passes into the tube 11. It then flows toward the tip end of the torch through the annular passage 34 within the baffle 33 and then away from the tip end of the torch through the annular passage 36 outside of the baffle 33. It flows from this annular passage into the casing 1 around the tubes 8, 9, 10 and 11 and is discharged from the casing through the water outlet 7. The flow of the cooling water is indicated by the arrows in Figs. 1, 2 and 4.

The annular water passages 34 and 36 are of restricted cross-section for the amount of water that is delivered to the torch. Moreover, the cross-section of the annular passage 36 between the water jacket and the baffle 33 is less than the cross-section of the annular passage 34 which in turn is less than the cross-section of the passage in the water supply tube or conduit 11. In other words these passages successively decrease in cross-section in the direction in which the cooling water flows through them. The result of this is to maintain a velocity of flow of the cooling water high enough to prevent the formation of steam pockets against the inside surface of the heat absorbing walls. Such pockets if allowed to form insulate the walls and permit local overheating.

The length of the torch depends upon the use to which it is to be put. For instance, it may be around 8 ft. in length. This enables deep holes to be made in the material operated upon. When cutting holes in metal objects the metal is preheated to kindling temperature by the preheating flames issuing from the discharge orifices 21 in the face of the tip in the usual way, and then the cutting oxygen is turned on by depressing the cutting oxygen lever 39 (Figs. 2 and 5) which opens the cutting oxygen valve as is well understood in the art. The torch is useful in cutting relatively deep holes in metal objects in connection with various operations. For instance, in cases where it is not possible or desirable to start cutting a thick metal work-piece at its edge, it may be used to cut a hole in the work-piece to produce a starting opening from which the work-piece may be further cut by traversing a torch from such opening over the work-piece. Or it may be used for cutting relatively deep holes in large pieces of scrap metal, such as skull, to receive an explosive in cases where it is desired to blast the large pieces of scrap metal into smaller pieces.

The torch may also be used for piercing deep holes in mineral substances for blasting or other purposes. In this case the torch is used as a heating torch and no cutting oxygen is supplied to the central passage 18 of the torch tip. The flames issuing from the discharge orifices 21 heat the mineral substance to the temperature necessary to melt it or disintegrate it. If desired, when the torch is thus used on mineral substances an inert gas under pressure may be supplied to the torch in place of the cutting oxygen and it may be delivered through the above described cutting oxygen passages so that it issues from the central discharge orifice 19 in the torch tip for the purpose of blowing the slag out of the hole produced by the torch.

I claim:

1. A gas torch comprising a casing, a head within the casing, a tip operatively associated with the head and provided with discharge orifices, means for delivering gases through the head and tip for issuance from said orifices, means forming a passage for maintaining cooling liquid in contact with the head and adapted to conduct the cooling liquid toward the tip end of the torch throughout the length of the head, means forming a passage in the casing for supplying the cooling liquid to said first-named passage, and means forming a return passage for the cooling liquid coextensive with the length of the head, the return passage having a cross-sectional area less than the cross-sectional area of the passage to which the cooling liquid is supplied to increase the velocity of cooling liquid flowing therethrough and being adjacent the longitudinal portion of the torch which is subjected to the greatest amount of heat when the torch is in operation.

2. A gas torch comprising a casing, a head within the casing, a tip operatively associated with the head and provided with discharge orifices, means for delivering gases through the head and tip for issuance from said orifices, a baffle in the casing coaxial with the head and forming with the head an inner annular passage for maintaining cooling liquid in contact with the head and also forming with a part of the casing an outer annular passage for the cooling liquid which is coaxial with the first-named annular passage and surrounds the same, and a conduit for supplying cooling liquid to the rear end of the inner annular passage so that it flows therethrough toward the tip end of the torch and returns through the outer annular passage, the outer annular passage having a cross-sectional area less than the cross-sectional area of the inner annular passage to increase the velocity of cooling liquid flowing therethrough.

3. A gas torch comprising a tubular casing, a cylindrical water jacket at the forward end of the casing, a head within the water jacket, a tip operatively associated with the head and provided with discharge orifices, means for delivering gases through the head and tip for issuance from said orifices, a cylindrical baffle carried by the rear portion of the head and projecting forwardly and forming with the head an inner annular passage for conducting cooling liquid and also forming with said water jacket an outer annular passage for the cooling liquid, and a water supply conduit connected to the rear end of said head and in communication with said inner annular passage, said outer annular passage being in communication at the rear of the head with the space within the casing.

4. A gas torch comprising a tubular casing, a head at the forward end of the casing, a tip operatively associated with the head and having gas passages terminating in jet orifices in the face of the tip, said head having passages for supplying gases to the passages in the tip, a plurality of tubes within the tubular casing to the forward ends of which said head is connected for supplying gases to the passages in the head, a water jacket at the forward end of the casing surrounding the head, a cylindrical baffle carried by the rear portion of the head and extending forwardly and forming with the head an inner annular passage for conducting cooling liquid and also forming with said water jacket an outer annular passage for the cooling liquid, and a water supply tube in the casing connected to the rear end of the head and in communication with said inner annular passage, said outer annular passage being in communication with the space in the tubular casing around the tubes within it.

5. A gas torch comprising a tubular casing, a torch head located beyond the forward end of the casing and having a tapered seat in its forward portion, a cylindrical water jacket threaded at its rear end onto the forward end of said casing and projecting forwardly over said head and enclosing the same but leaving a space between the head and the water jacket for the circulation of water, a tip having a conical rear end adapted to be received by said tapered seat in the head, a shoulder on the tip, and a flange on said water jacket at its forward end adapted to engage said shoulder on the tip and force the tip into its conical seat when the water jacket is screwed onto the casing.

6. A gas torch comprising a tubular casing, a head beyond the forward end of said casing, gas and water supply tubes within the casing and connected to the rear end of said head, the forward portion of said head having a tapered seat, a tip having a conical rear end adapted to be received by said seat, the head and tip having passages in communication with said gas supply tubes and terminating in discharge orifices in the face of the tip, a shoulder on the tip, and a cylindrical member threaded onto the end of the casing and projecting over the head and enclosing the same, said member having a flange at its forward end engaging the shoulder on the tip to seat the tip when said member is screwed onto the casing, the inner wall of said cylindrical member being spaced away from the outer surface of the head to allow for the circulation of cooling liquid, and the head having a passage placing the water supply tube in communication with the space surrounding the head.

7. A gas torch comprising a casing, a head within the casing, a tip operatively associated with the head and provided with discharge orifices, means for delivering gases through the head and tip for issuance from said orifices, means forming two communicating passages for conducting cooling liquid to cool the head, said passages extending lengthwise of the head and one surrounding the head and the other adapted to maintain cooling liquid in contact with a more inwardly portion of the head, and means forming a passage in the casing for supplying cooling liquid to one of said first-named passages, the passage to which the cooling liquid is thus supplied serving to conduct the cooling liquid toward the tip end of the torch throughout the length of the head and the other of the first-named passages serving as a return passage for the cooling liquid, said return passage being of smaller cross-sectional area than said passage to which said cooling liquid is supplied to increase the velocity of cooling liquid flowing therethrough and being adjacent the longitudinal portion of the torch which is subjected to the greatest amount of heat when the torch is in operation.

8. A gas torch comprising a tubular casing, a torch head located upon the forward end of the casing and having a tapered seat in its forward portion, a cylindrical water jacket threaded at its rear end onto the forward end of said casing and projecting forwardly over said head and enclosing the same but leaving a space between the head and the water jacket for the circulation of water, a tip having a conical rear end adapted to be received by said tapered seat in the head, a shoulder on the tip, and a flange on said water jacket at its forward end adapted to engage said shoulder on the tip and force the tip into its conical seat when the water jacket is screwed onto the casing, the face of the tip being substantially planar and lying substantially in a plane which is flush with the end face of the flange of the water jacket.

9. A gas torch comprising a casing, a head within the casing, a tip operatively associated with the head and provided with discharge orifices, means for delivering gases through the head and tip for issuance from said orifices, means forming communicating inner and outer passages extending lengthwise of the head, the outer passage having a cross-sectional area less than the cross-sectional area of the inner passage to increase the velocity of the cooling liquid flowing therethrough, and means forming a passage in the casing for supplying cooling liquid to one of said passages, the passage to which the cooling liquid is thus supplied serving to conduct the cooling liquid toward the tip end of the torch throughout the length of the head and the other passage serving as a return passage for the cooling liquid.

10. A gas torch comprising a tubular casing, a tip operatively associated with the casing and provided with discharge orifices, pipes extending through said casing for delivery of gases to issue from said discharge orifices, means forming an annular passage in the casing for conducting cooling liquid toward the tip end of the torch, a conduit for supplying the cooling liquid to said passage, means forming an annular return passage in the casing for the cooling liquid through which all of the cooling liquid must pass, and means for passing the water discharged from said return passage about said pipes before it is discharged from the torch, said conduit and said passages being successively smaller in cross-sectional area in the direction of flow of the cooling liquid through them and the passage of smallest cross-sectional area being adjacent the longitudinal portion of the torch which is subjected to the greatest amount of heat when the torch is in operation.

HOWARD G. HUGHEY.

REFERENCES CITED

The following references are of record in the file of this patent:

UNITED STATES PATENTS

| Number | Name | Date |
|---|---|---|
| 1,850,227 | Dinner | Mar. 22, 1932 |
| 1,192,573 | Schneider | July 25, 1916 |
| 2,184,561 | Babcock et al. | Dec. 26, 1939 |
| 2,286,191 | Aitchison et al. | June 16, 1942 |
| 1,198,188 | Bucknam | Sept. 12, 1916 |